United States Patent [19]

Fenner

[11] Patent Number: 5,561,706
[45] Date of Patent: Oct. 1, 1996

[54] SYSTEM FOR MANAGING ACCESS BY MOBILE USERS TO AN INTERCONNECTED COMMUNICATIONS NETWORK WHERE A BILLING AUTHORITY IS IDENTIFIED BY A BILLING CODE FROM THE USER

[76] Inventor: Peter R. Fenner, 600 Goodwin Dr., Richardson, Tex. 75081

[21] Appl. No.: 952,998

[22] Filed: Sep. 29, 1992

[51] Int. Cl.$^6$ ............................ H04Q 7/38; H04M 11/00; G06F 17/30
[52] U.S. Cl. .................... 379/60; 379/194; 395/200.9; 395/600
[58] Field of Search .................................. 395/800, 200, 395/325, 200.09; 455/33.1, 53.1; 379/58, 93–95, 114, 120, 121–128, 145, 185, 188–200, 210–212, 222, 59, 60; 355/33.2

[56] References Cited

U.S. PATENT DOCUMENTS

| | | | |
|---|---|---|---|
| 4,845,740 | 7/1989 | Tokuyama et al. | 379/91 |
| 4,860,341 | 8/1989 | D'Avello et al. | 379/91 |
| 4,899,373 | 2/1990 | Lee et al. | 379/207 |
| 4,955,049 | 9/1990 | Ghisler | 379/58 |
| 5,095,480 | 3/1992 | Fenner | 370/94.1 |
| 5,148,472 | 9/1992 | Freese et al. | 379/59 |
| 5,206,899 | 4/1993 | Gupta et al. | 379/120 |
| 5,210,787 | 5/1993 | Hayes et al. | 379/60 |
| 5,241,598 | 8/1993 | Raith | 380/21 |
| 5,247,520 | 9/1993 | Geise et al. | 370/94.1 |
| 5,247,698 | 9/1993 | Sawyer et al. | 455/33.1 |
| 5,255,307 | 10/1993 | Mizikovsky | 379/58 |
| 5,260,987 | 11/1993 | Mauger | 379/58 |
| 5,276,868 | 1/1994 | Poole | 395/600 |
| 5,282,244 | 1/1994 | Fuller et al. | 379/230 |
| 5,303,286 | 4/1994 | Wiedeman | 379/59 |
| 5,335,278 | 8/1994 | Matchett et al. | 380/23 |
| 5,341,410 | 8/1994 | Aron et al. | 379/59 |

OTHER PUBLICATIONS

Wittem et al., "Arithmetic Coping for Data Compression", Communications of the ACM, Jun. 1987 pp. 520–530 v30 N6.

"Intelligent Network: A Distributed System" by C. S Head, IEEE Communications Magazine, Dec. 1988, vol. 26, No. 12.
"PCN: Son of Cellular? The Challenges of Providing PCN Service" by R. J. Lynch Bell Atlantic Mobile Systems, IEEE Communications Magazine, Feb. 1991, vol. 29 No. 2.
"Personal Communications Services: Expanding the Freedom to Communicate" by S. Ginn Pacific Telesis Group, Feb. 1991, vol. 29, No. 2.

(List continued on next page.)

Primary Examiner—Thomas G. Black
Assistant Examiner—Jack M. Choules
Attorney, Agent, or Firm—Marc A. Hubbard; Winstead Sechrest & Minick

[57] ABSTRACT

A method and apparatus for managing a communications network for mobile users, each of which has a personal identification number, includes a network of communications switches for connecting calls between mobile users using the personal identification number as addresses. A plurality of billing authorities maintain service profiles and communicate with the communications switches. Also in communication with the switches are a plurality of location authorities. Each mobile user is assigned to a location authority. Each location authority tracks which switch, if any, each of its assigned mobile users is logged on to and permits logging onto only one switch at a time. A mobile user may subscribe to a plurality of billing authorities and maintain a plurality of service profiles with these authorities. A billing code entered by a mobile user designates a billing authority for a call. The billing authority forwards to the switch, if the switch is not already storing it, its service profile for the mobile user. A mobile user may contract with a location authority separate from the billing authority. Each communications switch includes a table for storing a limited number of individual service profiles. The directory table within the switch is linked to a number of queue lists for indicating the status of each service profile stored within the table.

19 Claims, 3 Drawing Sheets

OTHER PUBLICATIONS

"Personal Communications Services: The Next Technological Revolution" by R. M. Singer, D. A. Irwin, Hopkins & Sutter, IEEE Communications Mag., Feb. 1991, vol. 29. No. 2.

"Wireless Network Directions" by I. M. Ross, AT&T Bell Laboratories, IEEE Communic. Magazine, Feb. 1991, vol. 29, No. 2.

"Working–Set Coprocessor" by M. Milenkovic Technical Report 89–CSE–8 Dept. of Computer Science and Eng., SMU, Dallas, TX, Mar. 1989.

SYSTEM FOR MANAGING ACCESS BY MOBILE USERS TO AN INTERCONNECTED COMMUNICATIONS NETWORK WHERE A BILLING AUTHORITY IS IDENTIFIED BY A BILLING CODE FROM THE USER

TECHNICAL FIELD

The present invention relates to a system for managing a communication system, and more particularly to a system for managing a communication system containing a plurality of mobile personal identification numbers each corresponding to a system user.

BACKGROUND OF THE INVENTION

Present telephonic communications consist of a plurality switching units connected to individual telephones. Current billing and system management procedures are associated with the telephones present in a household or business. Thus, when a telephone is used to make a call, the billing charges are associated with the telephone and not with the individual making the call.

The concept of personal communications services (PCS) has been developed as a method for identifying telephone service independent of a telephone unit. The PCS concept envisions each telephone user having a personal identification number. Billing and call servicing are identified with the individual personal identification numbers and not with a telephone unit. The individualized nature of a PCS system raises several problems.

First, present telephone communication numbering and addressing systems are geographically oriented since the source telephone and the destination telephone numbers are always in predictable and set locations. Under the PCS concept, the personal identification numbers are not geographically constant and can move about. Thus, a system is required that is capable of locating and tracking personal identification numbers such that calls can be set up with and billed to the proper user. To date, few solutions have been presented as to how the management and billing of mobile personal identification numbers can be accomplished. Thus, a need has arisen for a system capable of locating and tracking personal identification numbers such that billing and connecting procedures may be accomplished.

SUMMARY OF THE INVENTION

The present invention overcomes the foregoing and other problems by means of a mobile address management system. The system uses multiple location authorities to track the locations of personal identification numbers and multiple billing authorities to maintain the services and the billing costs associated with a personal identification number (PID).

Each billing authority stores service profiles that are associated with personal identification numbers for which it has billing responsibility. The service profile describes the services for which a personal identification number is authorized. A personal identification number may be associated with multiple service profiles. For example, a personal identification number can have separate service profiles for personal calls and for business calls.

Each location authority is responsible for keeping track of the location of the personal identification numbers assigned to it. The location authority also has a fraud detection means to inform a PCS switching node of fraudulent uses of personal identification numbers attempting to use the node.

A fraud message is sent when concurrent or inconsistent uses of a personal identification number are detected by the system.

Switching means are capable of storing the service profiles associated with a personal identification number. Each profile within the switch is linked to one of several queue means indicating the status of a personal identification number.

BRIEF DESCRIPTION OF THE DRAWINGS

For a more complete understanding of the present invention and the advantages thereof, reference is now made to the following detailed description taken in conjunction with the accompanying drawings.

DETAILED DESCRIPTION OF THE INVENTION

Figure 1:
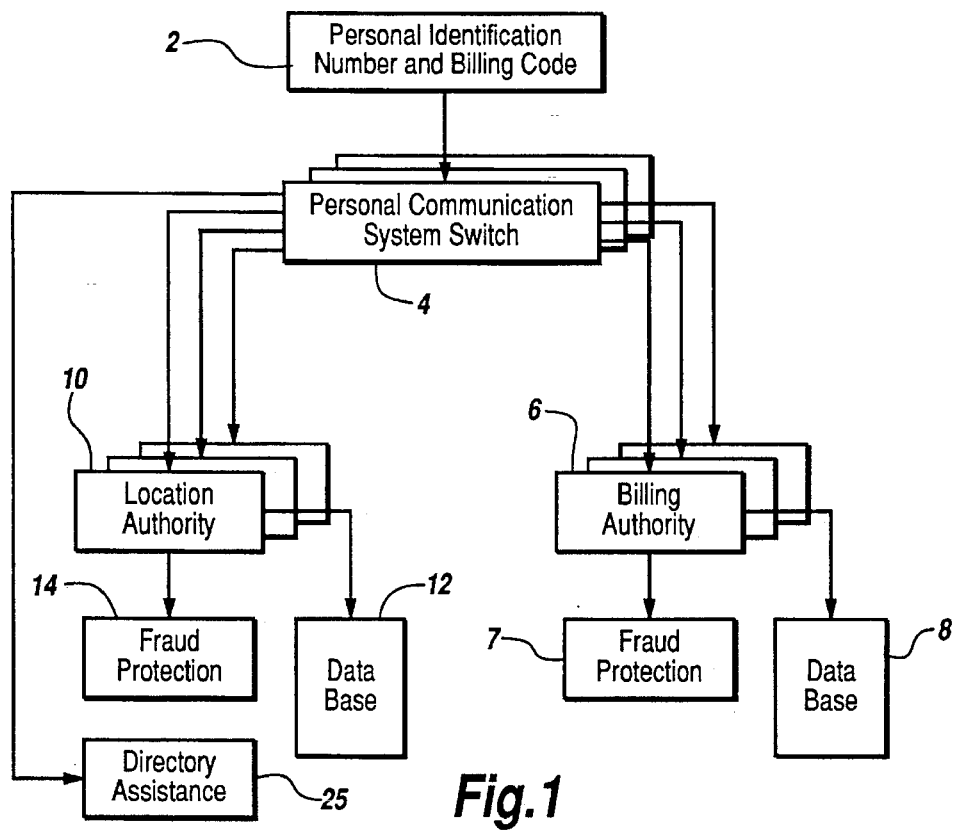
FIG. 1 is a block diagram illustrating the general architecture of a mobile address system in accordance with the present invention.

Referring now to FIG. 1, wherein there is shown a block diagram of the present invention. A plurality of personal identification numbers 2 are able to communicate with a personal communications systems switch 4 via wire line and radio frequency links. The personal identification numbers 2 are not associated with any particular communications unit or physical location but are associated with individual users.

The personal communications systems PCS switch 4, which will be more fully discussed later with respect to FIG. 2, has access to multiple billing authorities (6) via the standard telephone signalling system. Each billing authority 6 has access to a data base 8 of personal identification number service profiles which it manages. A billing code supplied by a billing authority to the PID user identifies a particular billing authority. A service profile identifies the services available to a particular personal identification number 2. A personal identification number 2 may have several service profiles associated with it. For example, one service profile can be associated with business uses, and another service profile can be associated with personal uses. Each service profile can be maintained by a different billing authority. The billing authority 6 allows the personal communications system switch 4 to determine whether to allow calls to or from a personal identification number and to determine what services are provided to the user. The billing authority employs a fraud protection means 7 for tracking the amount of time a PID is logged onto a particular switch. This means is responsible for preventing fraudulent billing by a switch operator.

A location authority 10 interacts with both the personal communications systems switch 4 and the billing authority 6. The location authority 10 is responsible for locating and tracking the personal identification numbers 2 assigned to its geographic area. This is accomplished by means of a data base 12 of the location of all personal identification numbers having their home base in the operating area of the location authority 10. The data base 12 is updated with the most recently known location of the personal identifications numbers 2.

A fraud protection means 14 is a part of the location authority 10 responsible for preventing fraudulent uses of a personal identification number 2. The fraud protection means 14 uses a check out protocol to determine if a personal identification number 2 is active in only one location. When a personal identification number is found to be active in two non-adjacent locations or active in a location that is not possible according to distance/time checks, the switch node attempting to check out the personal identification number is sent a fraud error message.

The PCS switch node also contains a directory assistance package 25. The directory assistance package 16 allows an individual to call users by name only. The name is automatically converted to a personal identification number. A distributed national database of personal identification numbers and the area codes of the location authorities of those numbers allows calling of a personal identification number when the home location authority is not known.

Figure 2:
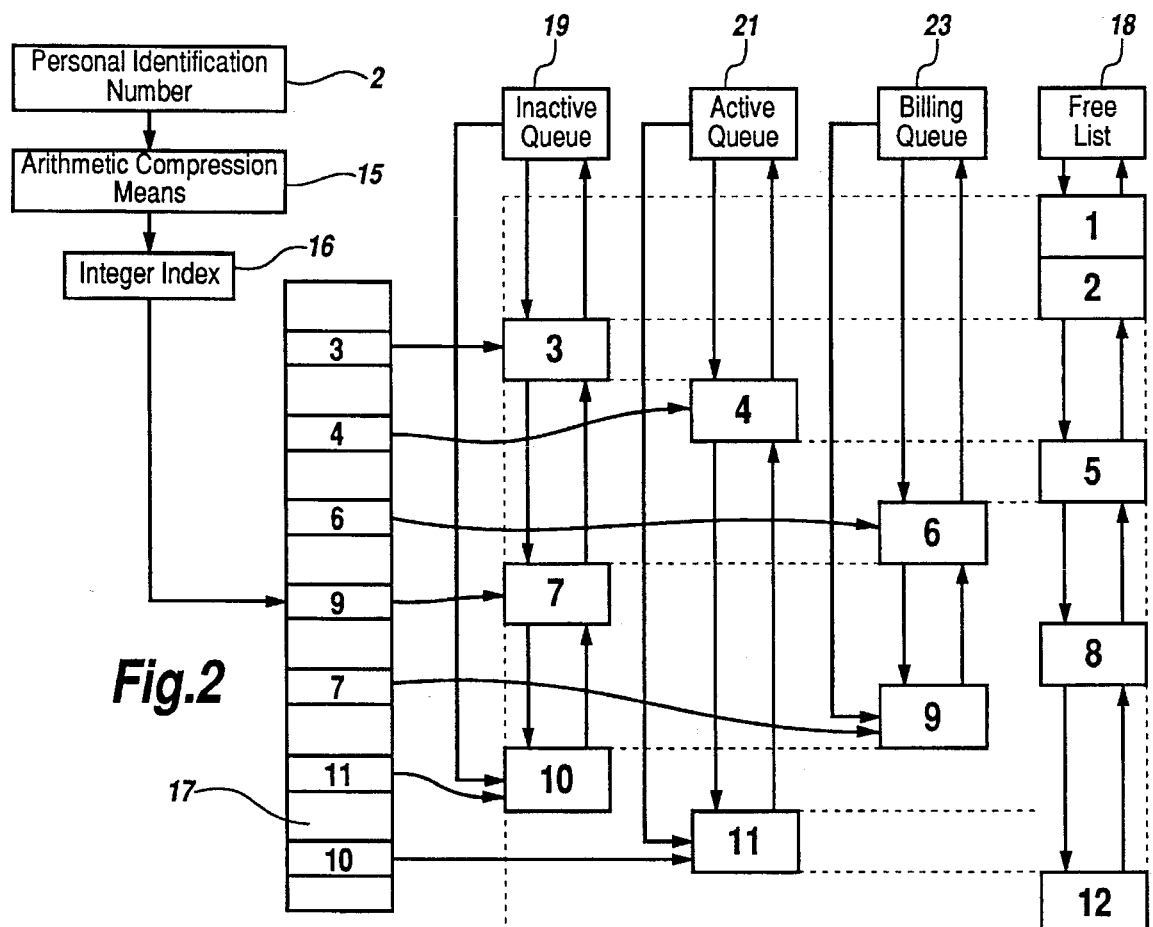
FIG. 2 is a block diagram illustrating the internal architecture of a personal communications system switch.

Referring now to FIG. 2, there is shown the architecture of a personal communications system switch active number database 4 of the present invention. This database maintains a table of active personal identification numbers, their service profiles, and the switch point to which they are currently connected. personal identification numbers 2 received from a user during logon or call setup are compressed by means of an arithmetic compression means 15 to an integer value 16 which acts as a pointer into a directory storage table 17 containing record storage areas for storing the service profiles and ports presently accessed by the switch 4. The apparatus and method for arithmetic compression and service profile storage can be similar to that described in co-pending application serial No. 07/737,147 now Pat. No. 5,498,258, filed Jul. 29, 1991 (attorney docket number 18945-1003).

All records in the directory storage table 17 are linked into one of four status queues. The free list 18 is a list of records not assigned to a personal identification number 2 and, thus, are not storing a service profile. When a new personal identification number 2 logs on to the switch 4, a record from the free list 18 list is assigned to the personal identification number 2.

The inactive queue 19 lists all inactive personal identification numbers in the order each has been inactive. Records at the front of the queue have been inactive the longest and are the least recently used. When a new personal identification number 2 logs onto a switch 4 and the free list 18 is empty, a record from the front of the inactive queue 19 is reassigned to the new personal identification number 2. The personal identification number 2 which was using the record is returned to its location authority.

The active queue 21 lists records ordered by the length of time the personal identification number 2 has been active in a call. The personal identification numbers 2 are placed in this list when a call set up procedure completes with a connection. Finally, the billing queue 23 lists records, whose billing information has not yet been recorded, ordered by the time the connection to a destination personal identification number 2 was terminated. A billing process (not shown) posts billing information from the first record in the queue 23 to an auxiliary data base (not shown). When the billing information has been pooled, the record is returned to the inactive queue 19.

Figure 3:
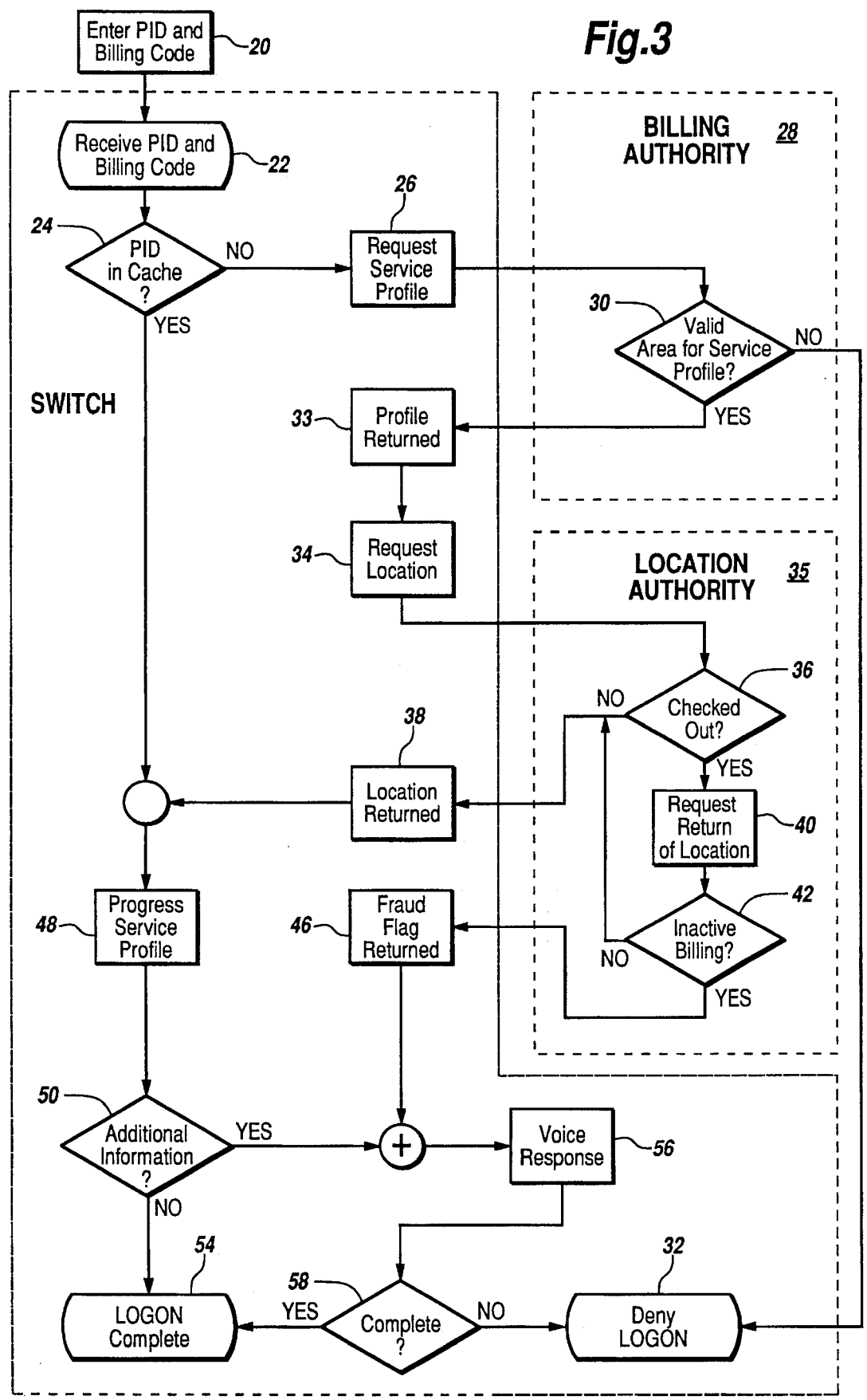
FIG. 3 is a flow, diagram illustrating the process for logging on to a switch.

Referring now to FIG. 3, there is presented an illustration of the procedure for logging onto a personal communications system switch 4. The user attempts to logon to a PCS switch at step 20 by entering his personal identification number 2 and billing code. The billing code can be any number code indicating a billing authority who maintains the service profile to be used. The PCS switch receives at step 22 the personal identification number 2 and billing code from the user. At inquiry step 24, the PCS switch 4 determines if the requested service profile for the personal identification number is already located in its directory storage table 17. If the service profile is not stored in the directory storage table 17 of the switch, the switch will request at step 26 the service profile from the billing authority 28. Before a service profile is forwarded to the PCS switch 4 by the billing authority 28, an inquiry is made at step 30 to determine if the source PCS switch is within the operating service area allowed by the service profile for the personal identification number. If the source PCS switch is not within the service area defined by the service profile, logon access is denied at step 32. If the switch is within an allowed service area, the service profile is returned to the switch at step 33.

At step 34, the switch makes a request for the location of the source personal identification number. The request is made to a location authority 35 identified by the service profile. At the location authority a determination is made at inquiry step 36 as to whether the source personal identification number has already been checked out. If the location of the source personal identification number is not checked out from the location authority 35, the location is returned to the PCS switch at step 38. However, if the location is presently checked out at step 36 the location authority requests at step 39 return of the location from the switch having control of the location.

Before return of the location of the personal identification number, the status of the personal identification number is determined at inquiry step 42. If it is determined at inquiry step 42 that the personal identification number is inactive, billing or active in an adjacent switch then the location of the personal identification number is returned to the source PCS switch at step 38. If the personal identification number is determined to be currently or recently active in a nonadjacent switch at step 42, then a possible fraud message is sent to the source switch at step 46 and additional information may be taken from the source PID caller at step 56.

Once the location of the personal identification number is obtained at step 38, the service profile is compared at step 48 with the services available on the current switch to determine the services the switch should provide. The handset is queried at step 50 to determine if additional information is required to establish the services to be provided. If additional information is not required, the logon to the switch is established at step 54. If additional information is required the information is requested and supplied at step 56. The switch determines if the logon is complete at inquiry step 58 and notifies the user of the success or failure of the logon process at step 54 or 32. After service selections are completed the switch informs the user of the effective connection and usage rate they will be charged for the requested service.

Figure 4:
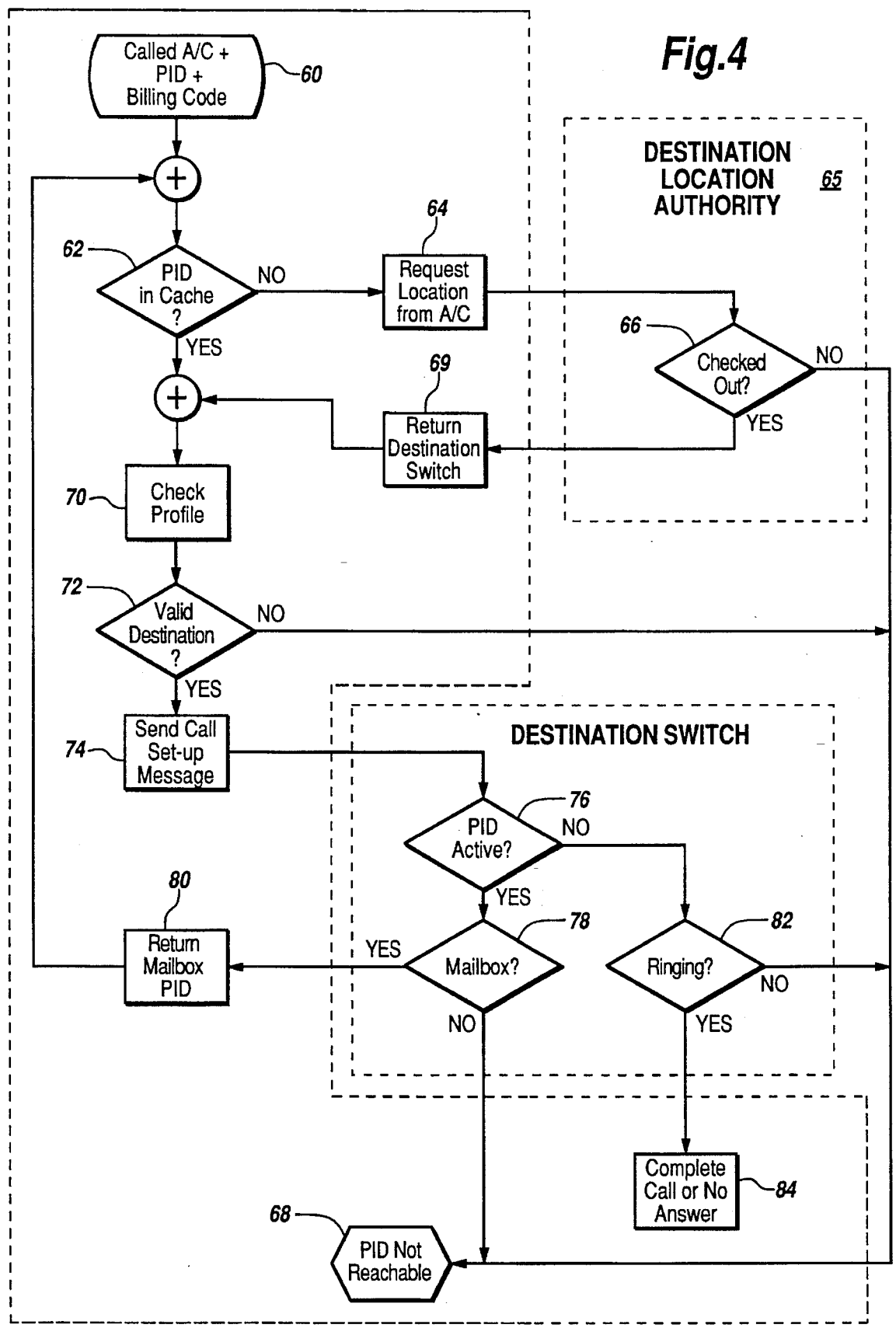
FIG. 4 a flow diagram illustrating the procedure for connecting a call between a source personal identification number and a destination personal identification number.

Referring now to FIG. 4, the procedure for connecting the source personal identification number to the destination personal identification number is illustrated. After the source personal identification number has logged on to the PCS switch, the PID may make calls to other PID's or regular wireline telephone numbers. The source PID sends the destination area code, destination personal identification number and the source service profile designation to the switch at step 60. The source switch determines at inquiry step 62 if the destination personal identification number is stored in its directory storage table. If the destination PID is stored in the local switch then the set-up proceeds to step 70. (i.e. this is a local call.) If the personal identification number is not stored in the directory storage table, a request is sent at step 64 to the destination location authority 65 identified by the home area code of the destination personal identification number.

At the destination location authority 65, an inquiry is made at step 66 to determine if the requested location is checked out. If the location is not checked out, a message is sent at step 68 to the source PCS switch indicating that the destination personal identification number is not available at the present time. (i.e. it has not logged-on to any PCS switch and cannot be contacted.) If a voice mail box number is available for the destination, then it could also be returned to the source switch.

If the destination personal identification number is located in the directory storage table of the source PCS switch or if the destination location authority 65 returns the location of the destination personal identification number at step 69, the source switch examines at step 70 the service profile of the source personal identification number and determines at inquiry step 72 if the destination personal identification number is at a location permitted access by the source personal identification number. If the destination location is invalid, the system proceeds to step 68 and notifies the user that the destination personal identification number is unreachable. If the destination is valid, the destination switch is sent a call set-up message at step 74.

On receipt of the call set-up message, the destination switch determines if the destination personal identification number is active or inactive at inquiry step 76. If the destination personal identification number is active, an inquiry is made at step 78 to determine if a mail box number, call waiting, or other busy service is available for the destination personal identification number. When the mail box number or other busy service is not available, the system proceeds to step 68 and the user is notified the destination personal identification number is not available (i.e. busy signal). If the destination personal identification number has a mail box number, the mail box number is returned to the source caller at step 80 and the system returns to step 62.

When the destination personal identification number is not active, the destination switch attempts to ring the destination personal identification number at inquiry step 82. If the number does not ring, the system moves to step 68 and the user is notified the destination personal identification number is not reachable. If the destination personal identification number does ring, the call is either completed or there is no answer at step 84.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

What is claimed is:

1. A method of providing access to a mobile user in a communications system having a plurality of interconnected radio frequency communication switches for selectively connecting calls to mobile users via radio frequency links, a plurality of billing authorities for maintaining service profiles of mobile users and a plurality of location authorities for maintaining current locations of mobile users within the interconnected communication switches, the method comprising:

receiving at a radio frequency communication switch a personal identification number from a mobile user;

receiving from the mobile user at the communication switch a billing code identifying one of the plurality of billing authorities maintaining a service profile for the mobile use, wherein different ones of the plurality of billing authorities may maintain the service profile or a second profile for the mobile user identified by the personal identification number;

requesting a service profile of the mobile user from the billing authority identified by the received billing code;

storing in memory the service profile received from the billing authority; and providing the mobile user access to the switch.

2. The method of claim 1 further comprising the steps of:

arithmetically compressing the personal identification number to unique integer index value;

storing the service profile in the database record pointed to by the integer index value.

3. The method of claim 1 further comprising:

maintaining a service profile for each mobile user active on the communications switch in the database memory; and overwriting an existing service profile record of inactive mobile users with new service profile received from new mobile users when an additional mobile user logs onto the switch and the number of service profiles stored by the database memory of the communication switch exceeds predefined capacity.

4. The method of claim 1 further comprising the step of requesting location for the mobile user from a location authority indicated by the received mobile identification number.

5. The method of claim 1 wherein access to the communication switch is not provided to the mobile user if the one of the plurality of location authorities indicates that the mobile user is on another switch.

6. The method of claim 1 further comprising the steps of:

receiving personal identification number of a destination mobile user;

checking whether the destination mobile user is logged onto the switch;

requesting location of the destination mobile user from a location authority indicated by the destination personal identification number if the destination mobile user is not logged onto the switch;

routing the call to a switch at which the destination mobile user is located.

7. The method of claim 1 further comprising:

receiving personal identification number of a destination user;

routing the call to the destination user only if calls to the destination location are permitted by the service profile of the source mobile user.

8. The method of claim 1 wherein mobile user is denied log-on if the switch is not in valid service area for the service profile maintained by the billing authority identified by the billing code.

9. The method of claim 1 further comprising step of checking whether a service profile from the billing code received by the switch is currently stored by the switch and, if not, then requesting the service profile from the billing authority.

10. A method of providing access to a mobile user in a communications system having a plurality of interconnected radio frequency communication switches for selectively connecting calls to mobile users via radio frequency links, a plurality of billing authorities for maintaining service profiles of mobile users and a plurality of location authorities for maintaining current locations of mobile users within the interconnected switches, the method comprising:

receiving at a radio frequency communication switch a personal identification number from a mobile user;

arithmetically compressing the personal identification number to unique integer index value;

storing a service profile in the database record pointed to by the integer index value; and providing the mobile user access to the switch according to the service profile.

11. The method of claim 10 further comprising:

maintaining a service profile for each mobile user active on the communications switch in the database memory; and overwriting an existing service profile record of inactive mobile users with new service profile received from new mobile users when an additional mobile user logs onto the switch and the number of service profiles stored by the database memory of the communication switch exceeds predefined capacity.

12. The method of claim 10 further comprising the steps of:

receiving personal identification number of a destination mobile user;

arithmetically compressing the destination personal identification number to determine whether a service profile for mobile user is stored at the switch and is logged onto the switch;

requesting location of the destination mobile user from a location authority indicated by the personal identification number if the destination mobile user is not logged onto the switch; and routing the call to a switch at which the destination mobile user is located.

13. The method of claim 10 further comprising the step of requesting location for the mobile user from a location authority indicated by the received mobile identification number.

14. The method of claim 13 wherein access to the switch is not provided to the mobile user if the location authority indicates that mobile user is active on another switch.

15. A method for controlling calls from a mobile users in a communications network having a mobile communication switch interconnected with other communication switches, the method comprising the steps of:

receiving at a local mobile communications switch an identification number from a mobile user;

accessing a database of service profiles of mobile users maintained at the switch and searching for a service profile corresponding to the identification number of the mobile user;

if the database of service profiles does not include the service profile for the mobile user, requesting the service profile of the mobile user from a billing authority indicated by a billing authority designator received from the mobile user, the billing authority being responsible for maintaining the service profile for the mobile user, and requesting a location for authorizing the log on of the mobile user from a locating authority indicated by a location authority designator received from the mobile user; and logging the mobile user onto the mobile communications switch upon the switch's receipt of the service profile from the billing authority and the location from the location authority;

wherein accessing the database of service profiles stored at the mobile communication switch includes arithmetically compressing the identification number of the source mobile user to an integer value, the integer value pointing to a location in the database storing the service profile.

16. The method of claim 15 wherein the user maintains service profiles at multiple billing authorities.

17. The method of claim 15 wherein the location authority authorizes the mobile communications switch to log on the mobile user if the mobile user is not logged onto a second communications switch; and, wherein, if the mobile user is logged onto another communications switch, the location authority requests the second mobile communications switch to log off the mobile user before permitting the mobile user to log onto the first communications switch.

18. In a communications network having a plurality of interconnected communication switches, and in which users are identified by a personal identification code wherever that user is located within the communications network, a method for completing a call from a source to a destination user comprising:

receiving from a source user logged onto a first communication switch a personal identification code of a destination user to whom a call is to be routed:

determining whether the destination user is currently logged onto the first communication switch; and if the destination user is not logged onto the first communication switch, identifying a location tracking authority assigned to the personal identification code of the destination user, requesting from the location tracking authority an identity for a destination communication switch on which the destination user is currently logged onto, receiving the identity of the destination communication switch at the first communication switch, and routing the call to the destination communication switch.

19. The method of claim 18 wherein the personal identification number of the source and the destination user are independent of a particular physical communications unit.

* * * * *

UNITED STATES PATENT AND TRADEMARK OFFICE
CERTIFICATE OF CORRECTION

PATENT NO. : 5,561,706
DATED : October 1, 1996
INVENTOR(S) : Peter R. Fenner

It is certified that error appears in the above-identified patent and that said Letters Patent is hereby corrected as shown below:

Column 2,
Line 21, "flow," should read -- flow --;
Line 23, "FIG. 4" should read -- FIG. 4 is --.

Column 6,
Line 8, "use," should read -- user --;

Signed and Sealed this

Eighteenth Day of May, 2004

JON W. DUDAS
*Acting Director of the United States Patent and Trademark Office*